US008985495B2

(12) United States Patent
Bae

(10) Patent No.: US 8,985,495 B2
(45) Date of Patent: Mar. 24, 2015

(54) DEVICE FOR PREVENTING ENTANGLEMENT OF WELDING WIRE

(75) Inventor: Hyo Young Bae, Pohang (KR)

(73) Assignee: Hyundai Welding Co., Ltd., Seoul (KR)

( * ) Notice: Subject to any disclaimer, the term of this patent is extended or adjusted under 35 U.S.C. 154(b) by 664 days.

(21) Appl. No.: 13/177,993

(22) Filed: Jul. 7, 2011

(65) Prior Publication Data

US 2012/0006802 A1 Jan. 12, 2012

(30) Foreign Application Priority Data

Jul. 9, 2010 (KR) .................... 10-2010-0066560
Jun. 21, 2011 (KR) .................... 10-2011-0060118

(51) Int. Cl.
*B65H 59/10* (2006.01)
*B65H 49/08* (2006.01)
*B23K 9/133* (2006.01)
*B65H 57/18* (2006.01)

(52) U.S. Cl.
CPC .............. *B65H 49/08* (2013.01); *B23K 9/1333* (2013.01); *B65H 57/18* (2013.01); *B65H 2701/36* (2013.01)
USPC ...................... 242/423.1; 242/128; 242/156.1

(58) Field of Classification Search
CPC ........ B65H 49/08; B65H 57/18; B65H 59/06; B65H 2401/213; B23K 9/1333; B65D 85/04
USPC ........ 242/156, 156.1, 156.2, 423.1, 566, 593, 242/128, 129; 206/408, 409, 397, 389, 413, 206/414, 817
See application file for complete search history.

(56) References Cited

U.S. PATENT DOCUMENTS

| | | | |
|---|---|---|---|
| 6,386,364 B2 | 5/2002 | Kawasaki et al. | |
| 6,547,176 B1 * | 4/2003 | Blain et al. | 242/423.1 |
| 6,745,899 B1 * | 6/2004 | Barton | 206/409 |
| 7,178,755 B2 * | 2/2007 | Hsu et al. | 242/423.1 |
| 7,950,523 B2 * | 5/2011 | Gelmetti | 206/408 |
| RE43,352 E * | 5/2012 | Cipriani | 242/423.1 |
| 8,393,467 B2 * | 3/2013 | Gelmetti | 206/408 |
| 2008/0142567 A1 | 6/2008 | Kim et al. | |
| 2009/0107867 A1 | 4/2009 | Bang et al. | |

FOREIGN PATENT DOCUMENTS

| | | |
|---|---|---|
| CN | 1251561 A | 4/2000 |
| CN | 101423138 A | 5/2009 |
| JP | 57166269 A | 10/1982 |
| JP | 6188968 U | 6/1986 |
| JP | 61183057 A | 8/1986 |
| JP | 04133973 A | 5/1992 |

(Continued)

*Primary Examiner* — William A Rivera
(74) *Attorney, Agent, or Firm* — The Webb Law Firm

(57) ABSTRACT

An welding wire entanglement prevention device disposed in an upper portion of the welding wire stacked unit for preventing the welding wire from being entangled when the welding wire stacked as continuous plural loops, is drawn out from a container, comprises a wire pressing section arranged at an upper portion of a welding wire stacked unit received in a container and in which a central cavity is formed wherein the wire pressing section comprises an upper plate-shaped flexible member made of a magnetic unit and a lower plate-shaped flexible member disposed in a lower portion of the upper plate-shaped flexible member, and the welding wire is drawn out into the cavity between the upper plate-shaped flexible member and the lower plate-shaped flexible member.

16 Claims, 11 Drawing Sheets

(56) References Cited

FOREIGN PATENT DOCUMENTS

| | | | |
|---|---|---|---|
| JP | 627268 Y2 | 7/1994 |
| JP | 738062 U | 7/1995 |
| JP | 08040642 A | 2/1996 |
| JP | 09156827 A | 6/1997 |
| JP | 11192552 A | 7/1999 |
| JP | 2004025220 A | 1/2004 |
| JP | 2007000927 A | 1/2007 |
| JP | 2007029971 A | 2/2007 |
| KR | 19870001076 B1 | 12/1981 |
| KR | 19910005819 Y1 | 8/1991 |
| KR | 9216429 U | 9/1992 |
| KR | 9221073 U | 12/1992 |
| KR | 19950000483 Y1 | 1/1995 |
| KR | 100859369 A | 7/2004 |
| KR | 20040059891 A | 7/2004 |
| KR | 1020040059894 A | 7/2004 |
| KR | 20050014669 A | 2/2005 |
| KR | 100740253 B1 | 7/2007 |
| KR | 20090116031 A | 11/2009 |
| KR | 20090116032 A | 11/2009 |
| KR | 20100004456 A | 1/2010 |

* cited by examiner

DEVICE FOR PREVENTING ENTANGLEMENT OF WELDING WIRE

CROSS-REFERENCE TO RELATED APPLICATIONS

This application claims the priority of Korean Patent Application No. 10-2010-0066560 filed on Jul. 9, 2010, and Korean Patent Application No. 10-2011-0060118 filed on Jun. 21, 2011, in the Korean Intellectual Property Office, the disclosure of which is incorporated herein by reference.

BACKGROUND OF THE INVENTION

1. Field of the Invention

The present invention relates to a device for preventing a welding wire entanglement in which welding wire may not be entangled when being drawn from a stacked welding wire stacked unit and received as a continuous loop by a container, so that continuous welding may be smoothly carried out.

2. Description of the Related Art

In general, in order to prevent a large capacity welding wire entanglement, there has been provided an entanglement prevention member for welding wire in which the welding wire is drawn out from an inner side of an annular member to an outer side thereof, in a state in which an annular member is arranged on an upper portion of a welding wire stacked surface stacked and received in a container.

The device for preventing an entanglement of the welding wire being drawn out from inner side has been disclosed in Korean Patent Publication No. 87-1076, Japanese Patent Laid-Open Publication So 61-183057 and Japanese Patent laid-Open Publication Pyeung 11-192552.

When welding wire is drawn out, a trailing wire, forming a spiral loop, may begin to move out of the spiral loop due to self-elasticity, such that a diameter of the loop may gradually be increased.

Eventually, the welding wire may bound between an outer circumference of a pressing member (retaining member) of inner drawing device and an inner wall of a container, due to a loop diameter being larger than an inner diameter of the container, thereby interrupting continuous welding.

Accordingly, in Korean Patent Publication No. 87-1076, a damper wing is provided on an annular member for preventing the welding wire from bounding between an outer circumference of the annular member and an inner wall of the container.

Additionally, it has been proposed that at the same time as welding wire is consumed, an annular member descends smoothly along the inner wall of the container.

Furthermore, in Japanese Patent Laid-Open Publication So 61-183057, a band is attached vertically to an inner wall of a container to prevent the welding wire from bounding between an outer circumference of an annular member and an inner wall of the container.

Here, the annular member descends smoothly along the attached band and an empty space between an upper portion of a welding wire stacked unit and the annular member is not formed, thereby preventing the welding wire from being entangled.

In particular, in Japanese Patent Laid-Open Publication So 61-183057, it is considered that welding wire may bound on an outer side of an annular member and be entangled.

However, in the entanglement prevention device for the welding wire being drawn out from the inside of the annular member, when the welding wire is drawn out through an drawing hole of the annular member, trailing welding wire may also be drawn out and entangled.

Additionally, as shown in FIG. 1 of the prior art, a band 1 passes through an aperture 5 formed in an annular member 3 and thus a part of the band 1 is largely bent toward a weld wire stacked body 7.

As a result, a portion of the welding wire stacked unit 7 in contact with the bent band 1 is compressed against the bent band 1, and thus a stacked state is varied, thereby decreasing a diameter of a welding wire loop forming a spiral loop. As a result, the welding wire may not be drawn out evenly and safely, and, in some cases, a trailing welding wire loop may also be drawn out.

Additionally, the annular member descends depending on the consumption of welding wire and the bend bed 1 varies continuously in the welding wire stacked unit 7. Furthermore, in some cases, the annular member is entangled and may not descend due to tension of the band 1.

In Korean Utility Model registration publication No. 91-5819 and Japanese Patent Laid-Open Publication Pyeung 4-133973, the problems as set forth above are thought to be caused by a light annular member and thus, in order to solve them, a weight body may be attached to the annular member. However, a drawn out trailing welding wire cannot be controlled.

In particular, in Japanese Patent laid-Open Publication Pyeung 11-192552, a drawing hole of the annular member is made to be small to control the welding wire trailing the drawn out wire.

However, the drawn out trailing welding wires may be entangled and thus unable to pass through the small drawing hole of the annular member, thereby interrupting a welding operation. A welding wire entanglement prevention device for welding wiredrawn to the outside of an annular member is disclosed in Japanese Patent laid-Open Publications Pyeung 8-40642 and Pyeung 9-156827.

In Japanese Patent laid-Open Publication Pyeung 8-40642, a damper wing is provided on the annular member and thus, the annular member descends smoothly along an inner wall of a container when the welding wire is consumed, similarly to Korean Patent Publication No. 87-1076.

Additionally, the damper wing made of soft material is provided and the welding wire can be drawn out between an inner wall of a container and the damper wing attached to the annular member.

Through this configuration a trailing welding wire is somewhat prevented from being drawn out; however, the welding wire may be entangled on the damper wing and drawing out resistance may be increased, and further, the annular member is drawn out, together with the welding wire.

Therefore, in Japanese Patent laid-Open Publication Pyeung 9-156827, a supplementary idea for the damper wing has been proposed; however, the problem has not been fundamentally solved.

In addition, referring to a large capacity welding wire drawn outside the annular member, when the welding wire is withdrawn, a trailing welding wire forming a spiral loop may be pushed into a central tube gap section of a stacked forming a vertical tube shape, fall thereinto and become entangled.

Another idea has been proposed to solve the problem as described above in Korean Utility Model publication Nos. 92-16429, 92-21073 and Korean Utility Model registration publication No. 95-483.

In Korean Utility Model publication No. 92-16429, there has been proposed an idea for solving the problems caused from large capacity welding wire being drawn to the outside of an annular member and the large capacity welding wire being drawn from inside an annular member.

That is, an annular member is put on an upper surface of the welding wire stacked unit and another small annular member is put in a hole in the annular member, and the welding wire may then be drawn out between two annular members.

However, the problem of the trailing welding wire being withdrawn is not solved and the same problem as that described in Japanese Patent laid-Open Publication Pyeung 8-40642 has arisen.

Furthermore, in Korean Utility Model publication No. 92-21073, an annular member provided with an entanglement jaw has been used; however, it is not sufficient to control a trailing welding wire to prevent entanglement.

In addition, in Korean Utility Model registration publication No. 95-483, in order to control a trailing welding wire a small annular member is inserted into a central hole of a welding wire stacked unit and further, a damper wing is disposed in an inner side of the annular member, and the welding wire may be drawn out from between the small annular member and the annular member provided with the damper wing.

Meanwhile, the damper wing controls trailing welding wire somewhat effectively; however, when the welding wire is drawn out, trailing welding wire may also be drawn out therewith, thereby not preventing entanglement.

Additionally, due to an empty space between the damper wing and an upper surface of the welding wire stacked unit, the welding wire may bound and be entangled.

In addition to these ideas, in Japanese Patent Laid-Open Publication Pyeung 4-133973, there has been disclosed that a magnetic member magnetically absorbing a wire is provided as a ring-shaped plate member as a wire entanglement device, and thus when the wire is drawn out, trailing wire is not drawn therewith.

However, in this case, resistance caused when the drawing weld wire is drawn out through the plate member is added to a resistance against the magnetic absorption, thereby dramatically increasing drawing resistance and adversely influencing a wire feeding ability.

The present inventor has proposed a welding wire entanglement prevention device from Korean Patent No. 10-859369 in order to solve the problems as set forth above, in which a flexible magnet body having a doughnut shape is disposed in an upper stacked surface of welding wires, thereby improving welding efficiency.

However, the flexible magnet body having a doughnut shape becomes worn during welding work and abrasive magnetic powders are adsorbed to be accumulated on a welding tip and a welding liner, and as a result, clogging of the welding tip and/or a welding liner is may occur intermittently.

A similar idea to that of the present inventor has been proposed in Korean Patent No. 10-870165 (claiming priority to U.S. Ser. No. 10/629,044); however, the problem of the magnetic body being worn out and the problem caused by magnetic powder have not yet been solved.

Furthermore, in Korean Patent Publication Nos. 10-2009-116031, 10-2009-116032 and 10-2010-4456, efforts have been made to solve the problems as set forth above, however, the results are unsatisfactory, which is considered to be an unsatisfactory result as in Japanese Patent Laid-Open Publication Pyeung 4-133973.

SUMMARY OF THE INVENTION

An aspect of the present invention provides a welding wire entanglement prevention device through which a welding wire trailing the welding wire being drawn out does not bound and is entangled while being drawn out, thereby enabling continuous welding.

Another aspect of the present invention provides a welding wire entanglement prevention device through which a feed ability is improved, thereby improving operational efficiency.

A welding wire entanglement prevention device disposed in an upper portion of the welding wire stacked unit for preventing the welding wire from being entangled when the welding wire stacked in continuous plural loops, is drawn out from a container, includes a wire pressing section which is disposed in an upper portion of a welding wire stacked unit received in a container and in which a central cavity is formed, wherein the wire pressing section includes an upper plate-shaped flexible member made of a magnetic unit and a lower plate-shaped flexible member disposed in a lower portion of the upper plate-shaped flexible member, and the welding wire is drawn out into the cavity between the upper plate-shaped flexible member and the lower plate-shaped flexible member.

The magnetic unit may be a rubber magnet.

The magnetic unit may have magnetic force strength of 300-1200 Gauss.

The magnetic unit may have magnetic force strength of 400-800 Gauss.

The lower plate-shaped flexible member may be made of resin film.

The central cavity of the upper plate-shaped flexible member may be equal to or smaller in size than a diameter of the central cavity of the wire stacked body, and the central cavity of the lower plate-shaped flexible member may be equal to or smaller in size than a diameter of the central cavity of the upper plate-shaped flexible member.

A plurality of cutting sections protruding to be in contact with an inner wall of the container may be provided on an outer circumference of the lower plate-shaped flexible member.

The upper plate-shaped flexible member and the lower plate-shaped flexible member may be connected integrally.

The magnetic unit may be prepared as a plural.

The welding wire entanglement prevention device may further include one or more remaining amount confirming windows for confirming a remaining amount of the welding wire.

The outer circumference of the upper plate-shaped flexible member and the outer circumference of the lower plate-shaped flexible member may be corresponded to each other, and the circumference may be equal to or smaller in size than a diameter of the bending section formed at a lower portion of the container.

A welding wire entanglement prevention device disposed in an upper portion of the welding wire stacked unit for preventing the welding wire from being entangled when the welding wire stacked in continuous plural loops is drawn out from a container, includes a wire pressing section which is disposed in an upper portion of a welding wire stacked unit received in a container and in which a central cavity is formed wherein the wire pressing section includes a lower plate-shaped flexible member and a plurality of magnetic units disposed in an upper portion of the lower plate-shaped flexible member and the welding wire is drawn out into the cavity between the lower plate-shaped flexible member and the plural magnetic units.

The magnetic unit may have magnetic force strength of 300-1200 Gauss.

The magnetic unit may have magnetic force strength of 400-800 Gauss.

The lower plate-shaped flexible member may be made of resin film.

The central cavity of the plural magnetic units may be equal to or smaller in size than a diameter of the central cavity of the wire stacked body, and the central cavity of the lower plate-shaped flexible member may be equal to or smaller in size than a diameter of the central cavity of the plural magnetic units.

A plurality of cutting sections protruding to be in contact with an inner wall of the container may be provided on an outer circumference of the lower plate-shaped flexible member.

The plural magnetic units and the lower plate-shaped flexible member may be connected integrally.

The outer circumference of the plural magnetic units and the outer circumference of the lower plate-shaped flexible member may be corresponded to each other, and the circumference may be equal to or smaller in size than a diameter of the cutting section formed at a lower portion of the container.

An aperture may be formed in the cutting section and may further include the guide section which is inserted into the aperture formed in the cutting section to be contact upwardly and downwardly with an inner wall of the container and guides the wire pressing section, allowing the welding wire among the welding wire stacked unit not to bound.

An aperture may be formed in the cutting section and may further include the guide section which is inserted into the aperture formed in the cutting section to be contact upwardly and downwardly with an inner wall of the container and guides the wire pressing section, allowing the welding wire among the welding wire stacked unit not to bound.

The cutting section may be made of a flexible body.

The shapes of the upper plate-shaped flexible member and the lower plate-shaped flexible member may correspond to a shape of the welding wire stacked unit and the cutting section may be bent to be contact with the inner wall of the container.

The shapes of the upper plate-shaped flexible member and the lower plate-shaped flexible member may correspond to a shape of the welding wire stacked unit and the cutting section may be bent to be contact with the inner wall of the container.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
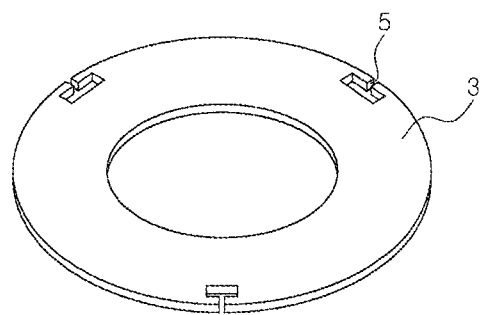
FIGS. 1(A) and 1(B) are a schematic perspective view and a side sectional view, respectively, of a prior entanglement prevention device of a welding wire.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

Figure 2:
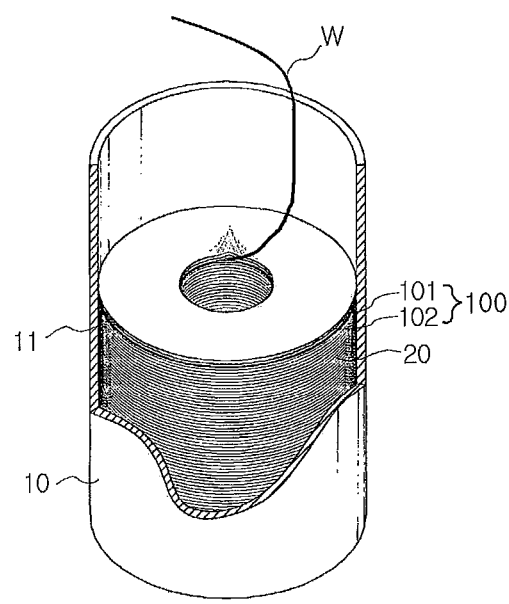
FIG. 2 is a schematic perspective view of a welding wire entanglement prevention device according to an embodiment of the present invention.

A device for preventing a welding wire from tangling according to an embodiment of the present invention is shown in FIG. 2.

A wire pressing section 100 may be arranged on an upper portion of a welding wire laminating body 20 in which welding wires W are laminated as continuous plural loop types and stored therein in a container 10.

The welding wire W may be prevented from tangling when it is pulled from the container 10 through the wire pressing section 100.

As shown in FIG. 2, the wire pressing section 100 may include an upper plate-shaped flexible member 101 and a lower plate-shaped flexible member 102 arranged under the upper plate-shaped flexible member 101.

Figure 8A:
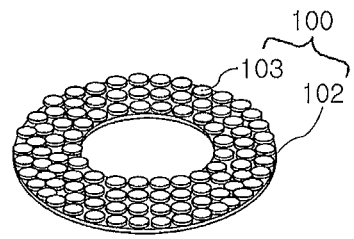
FIGS. 8(A), 8(B) and 8(C) are perspective views of the entanglement prevention device of the welding wire according to another embodiment of the present invention.
Figure 8B:
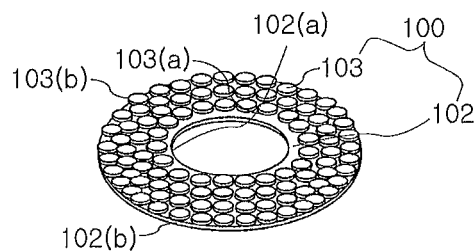
Figure 8C:
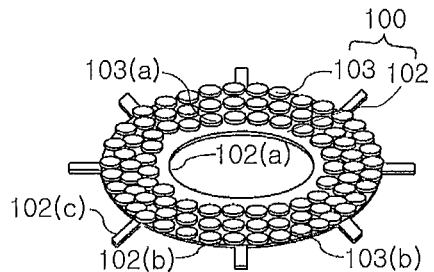
Figure 9:
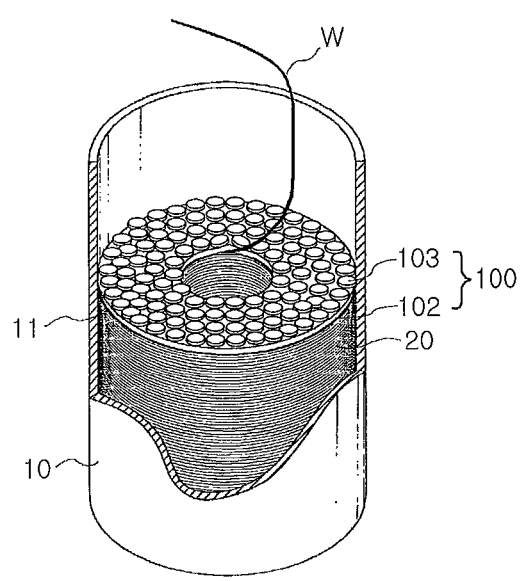
FIGS. 9 and 10 are perspective views of the welding wire being drawn into a central cavity of the plate-shaped flexible member of the entanglement prevention device of the welding wire according to another embodiment of the present invention.
Figure 10:
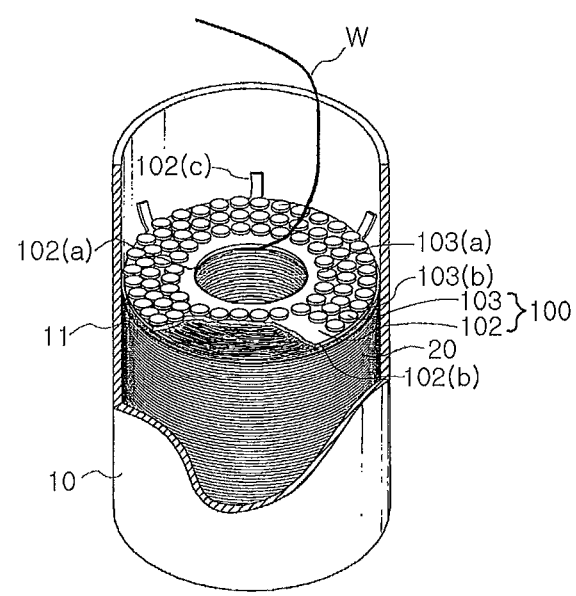
Figure 11:
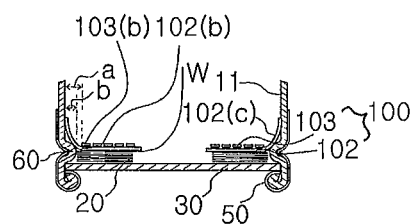
FIG. 11 a sectional view of the entanglement prevention device of the welding wire, depending on lower shape of a large capacity container, according to another embodiment of the present invention.

Additionally, the wire pressing section 100 may include a plurality of magnetic units 103 and the lower plate-shaped flexible member 102, as shown in FIG. 8.

Figure 6:
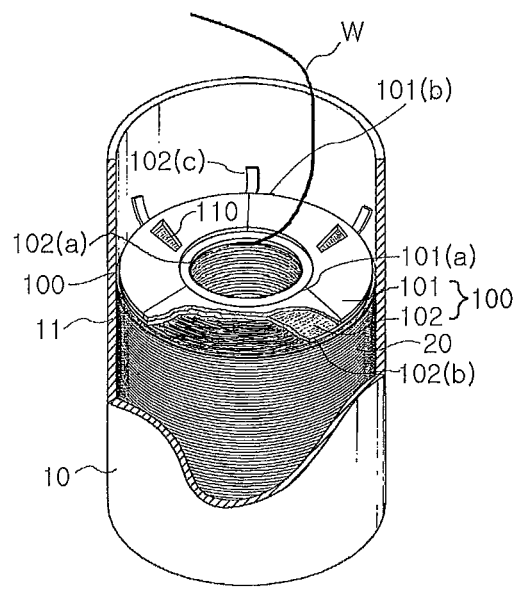
FIG. 6 is a perspective view of the welding wire being drawn into a central cavity of the plate-shaped flexible member arranged as layers in the entanglement prevention device of the welding wire.

Meanwhile, the upper plate-shaped flexible member 101 may be made from magnetic unit. Here, as shown in FIG. 6, the welding wire W is pulled through and used in central cavity sections 101(a) and 102(a) of the upper plate-shaped flexible member 101 and the lower plate-shaped flexible member 102 and thus a tangling of the welding wire W can be avoided.

Here, since the upper plate-shaped member 102 is made from magnetic unit and further, it consists partly the wire pressing section 100, comparing to a prior pressing member made of synthetic resin used as the wire pressing section, a drawing out resistance of the welding wire W can be decreased.

The a drawing out resistance decrease is caused by the wire pulling member being lighter than that of the prior art and further, it is moved flexibly depending on variations of the welding wire pulling parts.

In particular, in the case of a large capacity welding wire of an endless type which enables continual welding through connecting several containers 10, an end department of the welding wire W is pulled through a central cavity section of the prior synthetic resin pressure member and is fixed to an upper end of an inner wall of the container 10. Additionally, a front end of the welding wire W is also pulled through the central cavity section of the prior synthetic resin pressure member.

Therefore, there may be a state in which 2 strands of the welding wire W have been pulled simultaneously between the prior synthetic resin pressing member and the welding wire stacked unit 20 through the central cavity section of the prior synthetic resin pressing member, and when a wire front end is drawn out, one side of the pressing member is protruded a little due to an end of the welding wire W and thus there arises a problem in that the pressing member may not press evenly on an upper end of the wire stacked body 20, decreasing drawing safety.

However, according to a device for preventing a welding wire from tangling, since the upper plate-shaped flexible member 101 and the lower plate-shaped flexible member 102 of the wire pressing section 100 are made of flexible material, the entire wire pressing section has flexibility, thereby ensuring a drawing safety.

In addition, since the upper plate-shaped member 101 is made from magnetic unit, a trailing welding wire W can be avoided being drawn out, trailing the drawing welding wire W.

Furthermore, even in case of an upper surface of the welding wire stacked unit 20 not being flat, the wire pressing section 100 can be contact evenly with an entire upper surface of the welding wire stacked unit.

Meanwhile, since the upper plate-shaped flexible member 101 is made from magnetic unit, the welding wire W is forced to be out of the wire pressing section 100 due to its self-spring back, and thus a problem can be controlled that the welding wire is forced to rise between an outer tube 11 inside the welding container 10 and outer circumferences 101(b) and 102(b).

Additionally, since magnetic force of the upper plate-shaped flexible member 101 applies as minute attractive force (magnetic force) to an upper surface of the welding wire stacked unit 20 and a attractive force (magnetic force) greater than the minute force is applied to one strand of the welding wire W being drawn, the welding wire W is pulled into the central cavity sections 101(a) and 102(a) of the magnetic wire pressing section 100.

At this time, in addition to the one strand of the welding wire W being drawn, the attractive force of magnetic force is applied to the wire W placed on the upper surface of the welding wire stacked unit 20 and thus a problem can be avoided in which a wire trailing wire W is also pulled.

In addition, when the welding wire W is drawn out, the welding wire W is drawn out to the central cavity body and drawn, and rotated and entangled due to self-torsion stress.

However, this problem can be solved such that a minute attractive force of magnetic force applied to the upper surface of the welding wire stacked unit 20 is applied to the welding wire W and thus the rotation caused by the self-torsion stress of the welding wire can be controlled, thereby avoiding tangling.

When the upper plate-shaped flexible member 101 is made from a magnetic unit, the upper plate-shaped flexible member 101 may be prepared by using rubber magnet, strong magnetic unit orientated flexible plastic or fiber, etc., and the upper plate-shaped flexible member 101 may be preferably formed of a flexible rubber magnet.

Here, the rubber magnet may be formed by mixing ferrite powder and NBR resin such that it has flexibility due to rubber magnetic properties, and a plate shaped rubber magnet can be obtained easily in the marketplace.

Meanwhile, the rubber magnet may be formed to have a shape corresponding to the welding wire stacked unit 20 in which a central cavity section is formed. That is, when the welding wire stacked unit 20 is formed to have a donut shape, the rubber magnet also may be formed to have a doughnut shape.

Additionally, the magnetic unit may have preferably magnetic force strength of 300-1200 Gauss measured by a Gauss meter.

Here, the grounds of the magnetic unit having the range of magnetic force strength as described above are that if the magnetic force strength is less than 300 Gauss, the magnetic force is too weak, there is a limitation in the control of the welding wire W, and if the magnetic force exceeds 1200 Gauss, the magnetic force is too strong to control the welding wire W since when the welding wire W is pulled, drawing out resistance is increased.

Meanwhile, the upper plate-shaped flexible member 101 may more preferably have magnetic force strength of 400-800 Gauss.

A diameter of the generally used welding wire W is 0.8 mm-1.6 mm. Here, if the magnetic force strength is less than 400 Gauss, there is a limitation to controlling a welding wire W having a diameter of 1.6 mm.

Additionally, if the magnetic force strength exceeds to 800 Gauss, it is too strong to allow for the control of a welding wire W having a diameter of 0.8 mm.

Here, it is obvious that there are different control extents of the welding wire W. However, according to the device for preventing a welding wire from tangling, the control extent differences of the welding wire W do not appear in a special range of magnetic force strength.

For example, when the welding wire W having a diameter of 0.8 mm is influenced under magnetic force strength of 800 Gauss, magnetic force has relatively little affect on the welding wire W having a diameter of 0.8 mm due to a small contact area.

Meanwhile, when the weld wire W having a diameter of 1.6 mm is influenced under magnetic force strength of 400 Gauss, magnetic force influence on the welding wire having a diameter of 1.6 mm may be increased by a relatively large amount due to a large contact area.

Therefore, in a magnetic force strength range of 400-800 Gauss, welding wires W having different diameters of 0.8 mm-1.6 mm are used. Even though the magnetic force strength applying to the welding wire W is in a range of 400-800 Gauss, a drawing out resistance induced when the weld wire W is pulled is appropriately maintained.

The lower plate-shaped flexible member 102 may be made of resin film.

The welding wire W may be plated. Referring to copper plating when the welding wire W plated with copper is drawn out while being in direct contact with the magnetic unit as described above, the welding wire W may be magnetized, or marks may be produced on a surface of the welding wire W due to friction with the magnetic unit.

In particular, when the welding wire W plated with copper comes into contact with the magnetic unit, the plated part may be damaged and plating powder may be produced, thereby disturbing a welding process.

Additionally, in the case of a flexible magnetic unit such as a rubber magnet, etc., the rubber magnet, etc., may be damaged through friction with the welding wire W and further, fine rubber magnetic powders may be adsorbed and welded onto the welding wire W.

The wire pressing section 100 according to an embodiment of the present invention is configured in order to solve the problems as described above such that the lower plate-shaped flexible member 102 is formed of resin film and thus direct contact between the upper plate-shaped flexible member 101 and the welding wire W can be avoided.

In addition, the resin film has not only good flexibility but also sliding properties and may minimize the drawing out resistance when the welding wire W is pulled from the welding wire stacked unit 20.

Meanwhile, the lower plate-shaped flexible member (102) is prepared such that when a magnetic force of the upper plate-shaped flexible member 101 made from magnetic unit is strong, and a film thickness of the lower plate-shaped flexible member 102 is controlled for magnetic force applying to the welding wire stacked unit 20 to be adjustable.

Here, the resin film forming the lower plate-shaped flexible member 102 may be prepared with PET, PVC, PP, PE, or Nylon, etc.

Figure 3A:
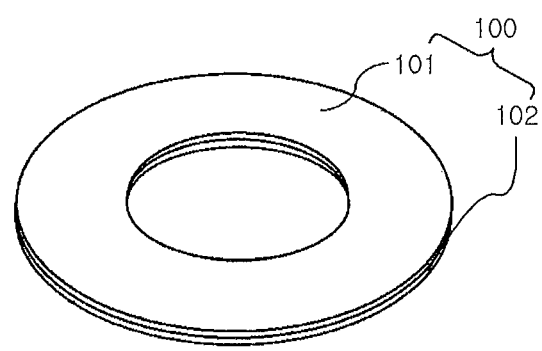
FIGS. 3(A), 3(B) and 3(C) are schematic perspective views of a welding wire entanglement prevention device according to various embodiments of the present invention, which are varied depending on a shape of a container.
Figure 3B:
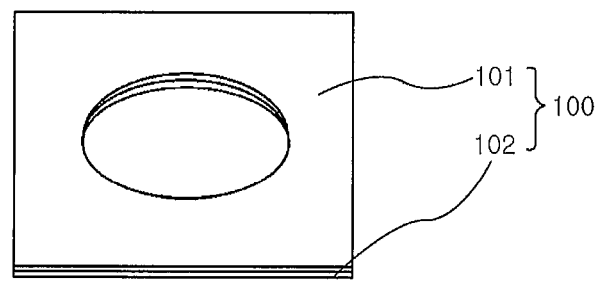
Figure 3C:
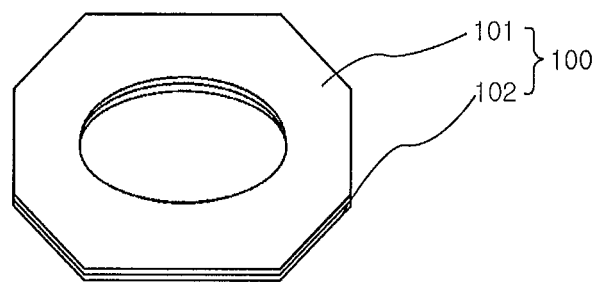

FIG. 3 shows the device for preventing a welding wire from tangling, depending on shapes of the container 10 of the welding wire W, according to an embodiment of the present invention. The welding wire W may be received in various containers 10 such as a cylindrical type, a rectangular type, a hexagonal box or an octagonal box, etc.

Therefore, the wire pressing section 100 according to an embodiment of the present invention may correspond to the shapes of the various containers 10.

Figure 4:
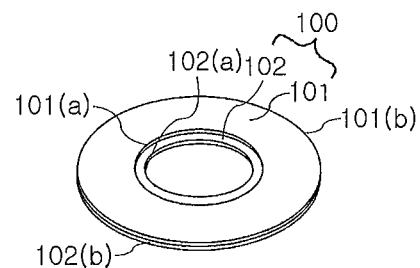
FIGS. 4 and 5 are perspective views of variations of a welding wire entanglement prevention device according to embodiments of the present invention.
Figure 5:
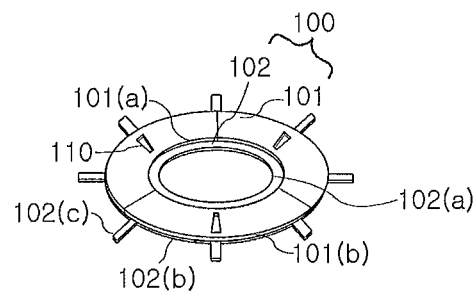

Furthermore, as shown in FIG. 4 or FIG. 5, the central cavity section 101(a) of the upper plate-shaped flexible member may be smaller in size than or equal to a diameter of a central cavity section of the welding wire stacked unit 20 and thus the magnetic force of the upper plate-shaped flexible member 101 may influence an entire upper surface of the welding wire stacked unit 20 evenly.

In addition, the central cavity section 102(a) of the lower plate-shaped flexible member may be equal to or smaller in size than a diameter of the central cavity section 101(a) and thus when the welding wire W is pulled into the central cavity section of the welding wire stacked unit 20, the welding wire may not have friction with the upper plate-shaped flexible member 101 and only minute friction is produced on the central cavity section 102(a) of the lower plate-shaped flexible member, thereby minimizing drawing out resistance.

As shown in FIGS. 5 and 6, a plurality of cutting sections 102(c) may be provided on an outer circumference 102(b). These cutting sections 102(c) may protrude to be in contact with an inner wall of the container 10.

As a result, the welding wire W descends along the inner wall of the container 10 while contacting the inner wall and thus the entire amount of the welding wire W may be exhausted without being biased to one side.

When the upper plate-shaped flexible member 101 and the lower plate-shaped flexible member 102 are assembled integrally, they are kept firm.

Here, the assembling method may include a both side tape attachment, a bonding agent attachment, or a high-frequency thermal compression attachment, etc.

Additionally, a Thomson process may be applied to the upper plate-shaped flexible member 101, and when it is applied, a plurality of flexible bodies may be assembled in order to decrease loss portion.

Figure 7:
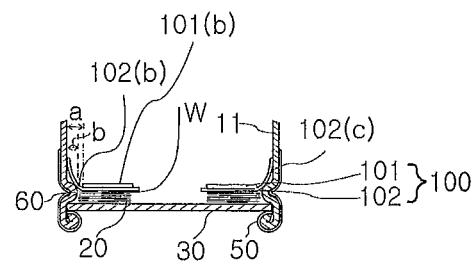
FIG. 7 is a sectional view of another embodiment of the present invention, depending on a shape of a lower portion of the container.

Furthermore, an outer circumference 101(b) of the upper plate-shaped flexible member and an outer circumference 102(b) of the lower plate-shaped flexible member correspond to each other as shown in FIG. 7, and they may be equal to or smaller than a diameter of the bending section 60 formed at a lower portion of the container 10.

In case of a cylindrical container 10, the bending section 60 may be disposed in a lower portion of the outer tube 11 of the container for fixing a bottom plate 30.

Here, when the welding wire W is exhausted to a bottom of the container 10 in being pulled, there arises a problem in that the wire pressing section 100 is entangled through the bending section 60 and thus the wire pressing section 100 descends further.

Accordingly, an outer circumference 101(b) of the upper plate-shaped flexible member and an outer circumference 102(b) of the lower plate-shaped flexible member correspond to each other, and they may be equal to or smaller than a diameter of the bending section 60 of a lower portion of the container 10, thereby solving the problem as described above.

Meanwhile, as shown in FIG. 6, the wire pressing section 100 may include one or more confirming windows 110 of welding wire remaining amount for confirming the remaining amount of the welding wire W. Here, the confirming window 110 of welding wire remaining amount may be prepared by forming an aperture through the wire pressing section 100 in order to confirm directly the remaining amount of the welding wire W.

Here, the confirming window 110 of welding wire remaining amount may be apertures formed on both of the upper plate-shaped flexible member 101 and the lower plate-shaped flexible member 102.

Additionally, the lower plate-shaped flexible member 102 may be made of transparent resin film, and the aperture may be formed on only the upper plate-shaped flexible member 101.

A device for preventing a welding wire from tangling according to another embodiment of the present invention is shown in FIGS. 8-11.

As shown in FIGS. 8-11, the wire pressing section 100 may include a plurality of magnetic units 103 disposed in an upper portion of the lower plate-shaped flexible member 102.

Furthermore, the welding wire W may be pulled through a central cavity section 103(a) of the plurality of the magnetic units 103 and the central cavity section 102(a) of the lower plate-shaped flexible member.

Even though the plurality of magnet units 103 such as Neodymium, Alnico, Samarium, Ferrite, or Bonded Magnets may be disposed in an upper portion of the lower plate-shaped flexible member 102, the same effects as in FIG. 2-7 may be obtained.

The plurality of magnetic units 103 may have magnetic force strength in a range of 300-1200 Gauss, and may be preferably in a range of 400-800 Gauss.

In addition, the lower plate-shaped flexible member 102 may be made of resin film. Here, the central cavity section 103(a) of the plurality of magnetic units may be equal to or smaller in size than a diameter of the central cavity section of the welding wire stacked unit 20, and the central cavity section 102(a) of the lower plate-shaped flexible member may be equal to or smaller in size than a diameter of the central cavity section 103(a) of the plurality of magnetic units.

As a result, when the welding wire W is drawn out, it may not be entangled through the plurality of magnet units 103.

Meanwhile, a plurality of cutting sections 102(c) protruding to be in contact with an inner wall of the container 10 may be provided on an outer circumference 102(b) of the lower plate-shaped flexible member.

Additionally, the plurality of magnet units 103 and the lower plate-shaped flexible member 102 may be assembled integrally and further an outer circumference 103(b) of the plurality of magnetic units and an outer circumference 102(b) of the lower plate-shaped flexible member may be corresponded to each other, and the outer circumferences may be equal to or smaller than a diameter of the bending section 60 formed at a lower portion of the container 10.

The reason is the same as in embodiments shown in FIGS. 2-7 and further, the same effects may be obtained.

Figure 12:
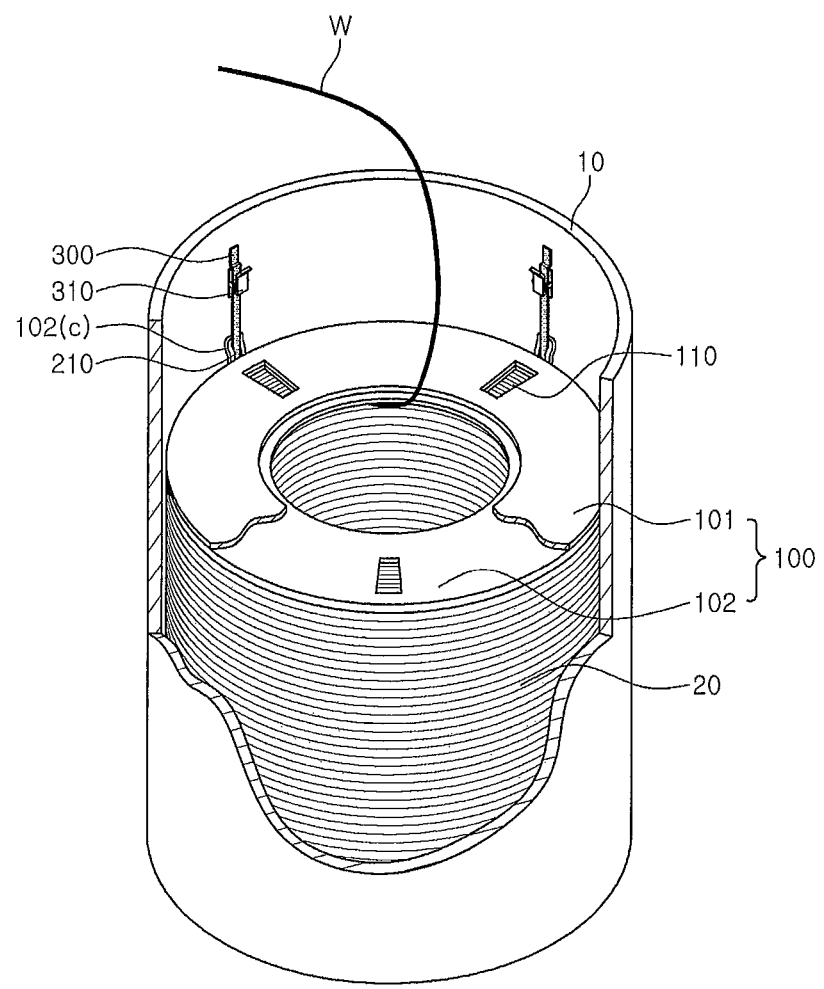
FIG. 12 is partially exploded perspective view of the entanglement prevention device of the welding wire according to another embodiment of the present invention.

Referring to FIG. 12, the welding wire W may be laminated on a space formed in the container 10. Here, the container 10 may have a cylindrical form and the welding wire W may be laminated on inner space of the container 10 in a coil form. In addition, a cavity section may be disposed in a center of the container 10.

The wire pressing section 100 may be arranged in the container 10. That is, in a state of that the welding wire W is laminated through the space formed in the container 10, the wire pressing section 100 may be disposed in an upper portion of the welding wire stacked unit 20 and a tangling of the welding wire W can be avoided when it is drawn out.

Referring to FIG. 12, the wire pressing section 100 is arranged inside the container 10, and further is placed at an upper portion of the welding wire stacked unit 20 and is contact with an upper surface thereof.

Figure 13A:
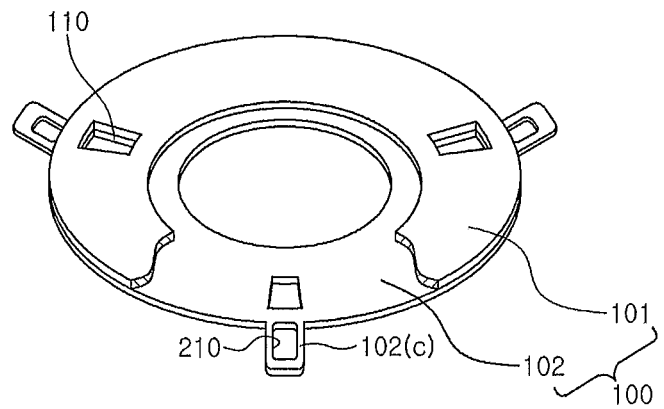
FIGS. 13(A) and 13(B) are a perspective view of the wire pressing section provided with an aperture and a assembled perspective view of the cutting section and the guide portion in the entanglement prevention device of the welding wire.
Figure 13B:
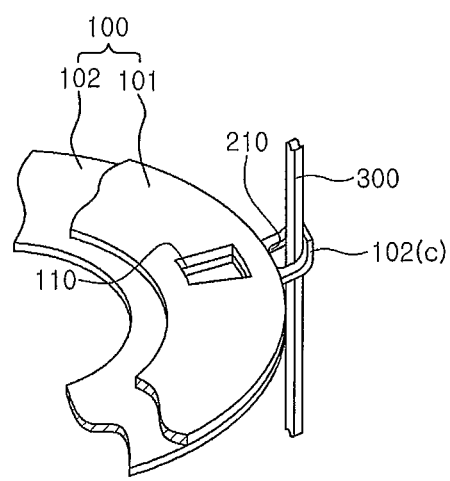
Figure 14:
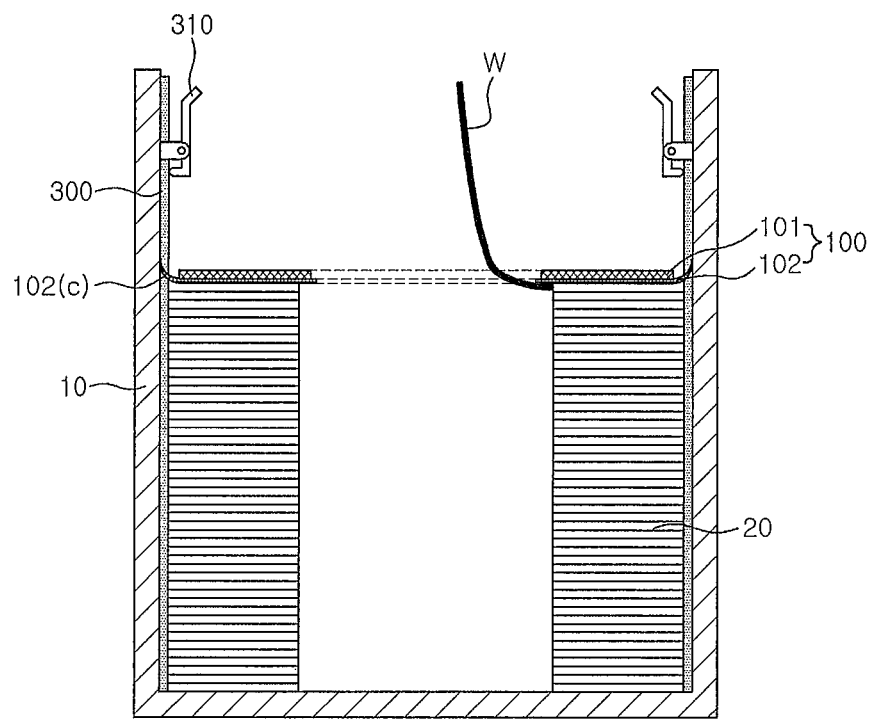
FIG. 14 is a side sectional view of the entanglement prevention device of the welding wire according to another embodiment of the present invention.

The wire pressing section 100, as shown in FIGS. 12-14, may include the upper plate-shaped flexible member 101 and the lower plate-shaped flexible member 102. Here, the upper plate-shaped flexible member 102 may be made from magnetic units and the lower plate-shaped flexible member 101 may be made of resin film.

Additionally, the wire pressing section 100 may include a plurality of magnetic units 103 and the lower plate-shaped flexible member.

The entire wire pressing section 100 may be flexible since the upper plate-shaped flexible member 101 and the lower plate-shaped flexible member 102 are flexible, and thus the wire pressing section 100 may be moved flexibly depending on a varied pulling part of the welding wire W, thereby decreasing the drawing out resistance.

The wire pressing section 100 may be arranged, one side of contact with an inner wall of the container 10, and further a central cavity section may be formed at a center of the wire pressing section 100, corresponding to the central cavity section formed a center of the container 10.

A plurality of the cutting sections 102(c) provided with an aperture 210, respectively, may be arranged on one side of the wire pressing section 100, particularly, on an outer circumference of the wire pressing section 100 (referring to FIG. 13(a)). Here, A guide section 300 may be inserted into the cutting section 102(c) through the aperture 210 (referring to FIG. 13(b)).

The wire pressing section 100 may be correspondingly shaped to the shape of the welding wire stacked unit 20. That is, when the container 10 is a cylinder, the welding wire W is laminated as a coil form inside the container 10, and the welding wire stacked unit 20 may be a cylinder at a center of which a cavity is formed.

Here, the wire pressing section 100 may be a cylinder form at a center of which a cavity is formed, corresponding to a shape of the welding wire stacked unit 20, and the wire pressing section 100 may be disposed in an upper portion of the wire stacked body 20 and in this case the cutting section 102(c) is bent to be contact with an inner wall of the container 10.

The wire pressing section 100 may have a ring shape. That is, when the container 10 is a cylindrical form, the wire pressing section 100 may be a ring shape and it may be contact tightly with an inner wall of the container 10 wherein the wire pressing section 100 may descend smoothly depending on a use of the welding wire W in a state of being contact with an upper surface of the welding wire stacked unit 20.

Meanwhile, referring to FIGS. 12 and 13, the cutting sections 102(c) may be arranged on one side of the wire pressing section 100 and it may be prepared as a plural on each one of which the aperture 210 into which the guide section 300 may be inserted is formed.

The cutting section 102(c) may be made of flexible material such as plastic or resin film, etc. Here, when the cutting section 102(c) is made of flexible material, a plurality of the cutting section 102(c) may be contact with an inner wall of the container 10.

Here, the guide section 300 is inserted into the cutting section 102(c) through the aperture 210 formed therein and then is contact tightly with an inner wall of the container 10, and thus when the welding wire W is pulled and used, a variation of the wire stacked body 20 can be avoided to keep a loop diameter of the welding wire W formed as a spiral loop and further a dragging of the trailing welding wire W can be avoided when the welding wire W is pulled.

The cutting section 102(c) may be made from a flexible body and be formed integrally with the lower plate-shaped flexible member 102.

Meanwhile, when a shape of the wire pressing section 100 corresponds to that of the welding wire stacked unit 20 and the wire pressing section is disposed in an upper portion of the welding wire stacked unit 20, the cutting section 102(c) is bent to be contact with an inner wall of the container 10.

That is, as shown in FIG. 14, When the cutting section 102(c) is made from a flexible body, it may be extended from one side of the wire pressing section 100 and be bent upwardly at a location adjacent to an inner wall of the container 10 and then be contact tightly with the inner wall of the container 10. Here, the guide section 300 is inserted into the aperture 210 formed in the cutting section 102(c).

Here, the thinner of the cutting section 102(c) made from a flexible body may be more preferable and this intends to allow the guide section 300 to be maximally tight contact with the inner wall of the container 10.

Figure 1B:
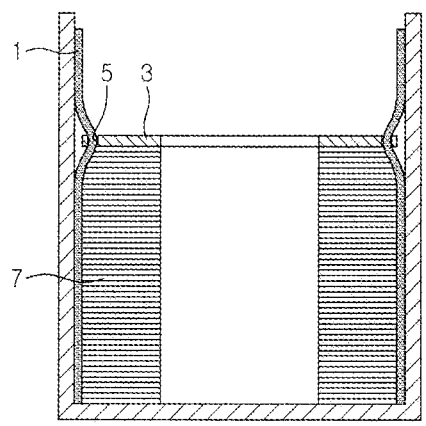

Comparing to the prior art in which, as shown in FIG. 1, an aperture 5 is formed in an annular member 3 and a band is inserted into the aperture 5 formed in the annular member 3, compression degree of the welding wire stacked unit can be decreased through the configuration as described above.

That is, comparing to the prior art, the guide section may be tight contact upwardly and downwardly with the inner wall of the container 10 in a state of a bending toward the welding wire stacked unit 20 being decreased.

Accordingly, a variation of the welding wire stacked unit 10 can be avoided to keep a loop diameter of the welding wire W formed as a spiral loop and a dragging of the trailing welding wire W can be avoided when the welding wire W is pulled.

Additionally, even though the guide section 300 tightly contacted upwardly and downwardly with the inner wall of the container 10 is bent, the wire pressing section 100 descends smoothly along the inner wall of the container 10 depending on a pulling of the welding wire W and thus entire amount of the welding wire W can be consumed without biasing to one direction, thereby improving a continuous welding efficiency.

Meanwhile, when the cutting section 102(c) is made from a flexible body, it may not be formed integrally with the wire pressing section 100. That is, the cutting section 102(c) is separately manufactured and then it may be assembled to one side of the wire pressing section 100. Here, the cutting section 102(c) may be formed on any one or more of an upper surface, a lower surface and an outer circumference of the wire pressing section 100.

However, the cutting section 102(c) made from a flexible body and the wire pressing section 100 may be integrally-formed preferably in consideration of manufacturing facilities and cost.

The cutting section 102(c) may be made of a flexible body in plural, for example 3. In the case of the 3 cutting sections 102(c), they are spaced apart from each other by a predetermined interval. That is, when three lines are extended from the respective 3 cutting sections 102(c) toward a center, an angle between each becomes 120°.

Referring to FIGS. 12-14, the guide section 300 may be inserted into the aperture 210 formed in the cutting section 102(c) to be contact upwardly ad downwardly with an inner wall of the container 10 and guide the wire pressing section 100, with allowing the welding wire W in the welding wire stacked unit 20 not to bound.

That is, the guide section 300 may be placed between the welding wire stacked unit 20 and the inner wall of the container 10 and further be inserted into the aperture 210 of the cutting section 102(c) formed on one side of the wire pressing section 100 and intersected, thereby avoiding fundamentally the welding wire W from bounding to between the inner wall and the wire pressing section 100.

The guide section 300 may be prepared such that a lower portion thereof may be connected the container 10 and an upper portion thereof may be attachable or detachable to the inner wall of the container 10. Here, the lower portion of the guide section 300 may be connected to a lower portion of the container 10 through various ways including a bonding or taping, etc.

The upper portion of the guide section 300, as shown in FIG. 14, may be inserted through one side of an attaching/detaching section 310 and the guide section 300 may be fixed to the inner wall of the container by pressing the attaching/detaching section 310 to push the guide section 300.

Meanwhile, the attaching/detaching section 310 may be pressed in an opposite manner to the method as described above and the guide section 300 may be detached from the attaching/detaching section 310.

The attaching/detaching section 310 may be formed though various ways and for example, connection methods including a buckle attached to a bend may be used for the guide section 300 to be attached/detached to the attaching/detaching section 310.

Here, the guide section 300 may be formed from various materials having flexibility such as plastic, etc.

As set forth above, according to exemplary embodiments of the invention, the welding wires formed as continuous loops can be drawn out in adverse order of laminating them with a constant resistance through magnetic absorption caused from a magnetic body.

As a result, a trailing loop of the welding wires can be prevented from being drawn out or the elastic welding wires can be prevented from bounding to be entangled with each other.

Additionally, a welding wire loop can be prevented from falling into a central cavity of a weld wire stacked body in a container not provided with an inner tube, and being entangled.

Here, the welding wire can be prevented from being entangled due to a spring back of the elastic welding wire.

Furthermore, disorder in the welding wire stacked unit due to long distance sea and land transportation can be prevented and further, even when the welding wire is loaded on a high-speed moving cart, it may not be disordered.

Additionally, a variation of a weight of the entanglement prevention device is not necessary, depending on differences of strength of the welding wire and elasticity and diameter.

Furthermore, an entanglement of welding wires can be settled through a moving of an entanglement prevention device by its weight and drawing resistance using a plate-shaped flexible body.

Additionally, even in case of a large capacity of the welding wire of an endless type, enabling a welding operation without an interruption through connecting a several containers, drawing safety can be ensured.

Meanwhile, welding bead serpentine movement produced from a twisting from a drawing resistance of the welding wire can be avoided, and even when an upper surface of the welding wire staked and received as continuous loops in a container is not flat, an entanglement when the welding wire can be prevented.

Additionally, the welding wire can be drawn without bounding through a cutting section of a lower portion of a cylindrical container and even the welding wire placed at bottom surface of the container can be consumed.

Furthermore, problems of the magnetic body abrasion and magnetic powders can be avoided by using a magnetic body, thereby decreasing a drawing resistance and improving feed ability.

In addition, a remaining amount of the welding wire can be easily confirmed through a remaining amount confirmation window.

Additionally, a plurality of cutting section s protrude to contact with an inner wall of container of the welding wire and descends along the inner wall of the container and thus entire amount of the welding wire can be consumed without being biased to one side.

Therefore, according to an entanglement prevention device of the welding wire, continuous welding efficiency can be improved and advantageous effects can be obtained.

Meanwhile, in the entanglement prevention of the welding wire according to an embodiment of the present invention, a guide section is inserted into an aperture formed in the cutting section to be contact upwardly and downwardly with the inner wall of the container, thereby dramatically decreasing a bending of the guide section toward the welding wire stacked unit, comparing to the prior art.

As a result, variations of a stacked state of the welding wire stacked unit can be decreased to keep a diameter of the welding wire loop forming a spiral loop and thus a trailing welding wire can be avoided being drawn out, when the welding wire is drawn.

Additionally, in the entanglement prevention of the welding wire according to an embodiment of the present invention, even when a wire pressing section descends, the welding wire stacked unit is not varied and the entire amount of the welding wire can be used without entanglement of the welding wire, thereby improving a consumption efficiency of the welding wire.

While the present invention has been shown and described in connection with the exemplary embodiments, it will be apparent to those skilled in the art that modifications and variations can be made without departing from the spirit and scope of the invention as defined by the appended claims.

What is claimed is:

1. A welding wire entanglement prevention device disposed in an upper portion of the welding wire stacked unit for preventing the welding wire from being entangled when the welding wire stacked in continuous plural loops, is drawn out from a container, comprising a wire pressing section disposed in an upper portion of a welding wire stacked unit received in a container and in which a central cavity is formed therein;

wherein the wire pressing section comprises an upper plate-shaped flexible member made of a magnetic unit and a lower plate-shaped flexible member disposed in a lower portion of the upper plate-shaped flexible member, the central cavity of the upper plate-shaped flexible member is smaller in size than a diameter of the central cavity of the wire stacked body, and the central cavity of the lower plate-shaped flexible member is smaller in size than a diameter of the central cavity of the upper plate-shaped flexible member, and;

the welding wire is drawn out into the central cavity from beneath the wire pressing member.

2. The welding wire entanglement prevention device of claim 1, wherein the magnetic unit is a rubber magnet.

3. The welding wire entanglement prevention device of claim 1, wherein the magnetic unit has magnetic force strength of 300-1200 Gauss.

4. The welding wire entanglement prevention device of claim 1, wherein the magnetic unit has magnetic force strength of 400-800 Gauss.

5. The welding wire entanglement prevention device of claim 1, wherein the lower plate-shaped flexible member is made of resin film.

6. The welding wire entanglement prevention device of claim 5, wherein the upper plate-shaped flexible member and the lower plate-shaped flexible member are connected integrally.

7. The welding wire entanglement prevention device of claim 5, wherein the outer circumference of the upper plate-shaped flexible member and the outer circumference of the lower plate-shaped flexible member correspond to each other, and the circumference is equal to or smaller in size than a diameter of the bending section formed at a lower portion of the container.

8. The welding wire entanglement prevention device of claim 1, wherein a plurality of cutting sections protruding to be in contact with an inner wall of the container are provided on an outer circumference of the lower plate-shaped flexible member.

9. The welding wire entanglement prevention device of claim 8, wherein an aperture is formed in the cutting section and further comprises the guide section which is inserted into the aperture formed in the cutting section to be contact upwardly and downwardly with an inner wall of the container, and guides the wire pressing section, allowing the welding wire among the welding wire stacked unit not to bound.

10. The welding wire entanglement prevention device of claim 9, wherein the cutting section is made of a flexible body.

11. The welding wire entanglement prevention device of claim 10, wherein the shapes of the upper plate-shaped flexible member and the lower plate-shaped flexible member correspond to a shape of the welding wire stacked unit and the cutting section is bent to be contact with the inner wall of the container.

12. The welding wire entanglement prevention device of claim 1, wherein the upper plate-shaped flexible member and the lower plate-shaped flexible member are connected integrally.

13. The welding wire entanglement prevention device of claim 1, wherein the magnetic unit comprises a plurality of flexible bodies.

14. The welding wire entanglement prevention device of claim 1, further comprising one or more remaining amount confirming windows for confirming a remaining amount of the welding wire.

15. The welding wire entanglement prevention device of claim 1, wherein the outer circumference of the upper plate-shaped flexible member and the outer circumference of the lower plate-shaped flexible member correspond to each other, and the circumference is equal to or smaller in size than a diameter of the bending section formed at a lower portion of the container.

16. The welding wire entanglement prevention device of claim 1, wherein a plurality of cutting sections protruding to be in contact with an inner wall of the container are provided on an outer circumference of the lower plate-shaped flexible member.

* * * * *